US009436892B2

(12) United States Patent
Hu et al.

(10) Patent No.: US 9,436,892 B2
(45) Date of Patent: Sep. 6, 2016

(54) METHOD AND APPARATUS FOR FACIAL DETECTION USING REGIONAL SIMILARITY DISTRIBUTION ANALYSIS

(71) Applicant: Hong Kong Applied Science and Technology Research Institute Co. Ltd., Shatin, New Territories (HK)

(72) Inventors: Jinhui Hu, Shatin (HK); Yi Tian, New Territories (HK); Min Chen, Shan Tseng (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 229 days.

(21) Appl. No.: 14/268,149

(22) Filed: May 2, 2014

(65) Prior Publication Data

US 2015/0317513 A1   Nov. 5, 2015

(51) Int. Cl.
*G06K 9/00* (2006.01)
*G06K 9/62* (2006.01)
*G06K 9/52* (2006.01)
*G06K 9/46* (2006.01)

(52) U.S. Cl.
CPC ......... *G06K 9/6201* (2013.01); *G06K 9/00288* (2013.01); *G06K 9/469* (2013.01); *G06K 9/4642* (2013.01); *G06K 9/52* (2013.01)

(58) Field of Classification Search
None
See application file for complete search history.

(56) References Cited

U.S. PATENT DOCUMENTS

| 2008/0235165 A1* | 9/2008 | Movellan | G06K 9/00248 706/12 |
| 2011/0085728 A1* | 4/2011 | Gao | G06K 9/4671 382/165 |
| 2012/0113106 A1* | 5/2012 | Choi | G06T 11/00 345/419 |

FOREIGN PATENT DOCUMENTS

| KR | 2012066462 A | 6/2012 |
| KR | 2013059212 A | 6/2013 |

OTHER PUBLICATIONS

Person-Specific Sift Features for Face Recognition, Luo et al. 1-4244-0728-1, IEEE, 2007, pp. II-593 to II-596.*
Person-Specific Sift Features for Face Recognition, Luo et al. 1-4244-0728-1, IEEE, 2007, pp. 11-593 to II-596.*
Distinct image features—keypoints, David G Lowe, Jan. 2004, pp. 1-28.*
Liu, et al, "A Facial Sparse Descriptor for Single Image Based Face Recognition," Elsevier B.V., Neurocomputing 93, 2012, pp. 77-87.

* cited by examiner

*Primary Examiner* — Jayesh A Patel
(74) *Attorney, Agent, or Firm* — Berkeley Law & Technology Group, LLP

(57) ABSTRACT

A method and apparatus for facial recognition by a computing device using an adaptive search window and regional similarity distribution analysis are disclosed herein.

20 Claims, 5 Drawing Sheets

METHOD AND APPARATUS FOR FACIAL DETECTION USING REGIONAL SIMILARITY DISTRIBUTION ANALYSIS

FIELD

The present disclosure relates generally to facial recognition.

BACKGROUND

Technology related to the recognition of faces, or facial recognition, is becoming increasingly prevalent. For example, in social networks and image storing and sharing technologies, facial recognition functionality is becoming an increasingly common functionality offered. For instance, when a photograph is uploaded to a social network or some image storing/sharing website, the photograph may be scanned, faces identified, and matched against other users of the social network or image storing/sharing website. Facial recognition may also offer benefits in the field of security. By way of example, certain devices may offer facial recognition technology in order to access the contents of the device, such as to unlock at device at a lock screen. Additionally, facial recognition technology may offer benefits in the fields of surveillance and/or police work. For instance, using facial recognition to detect a suspect in a surveillance feed or in a crowd of people highlights the potential utility of facial recognition.

However, any number of factors can limit the usefulness of facial recognition technology. For instance, factors that may hamper the ability of making a facial recognition match may include, makeup, appearance changes, accessories, and facial expressions, among other things. Additionally, part of a target face may be partially obscured, which also may render making a facial recognition match more difficult.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1:
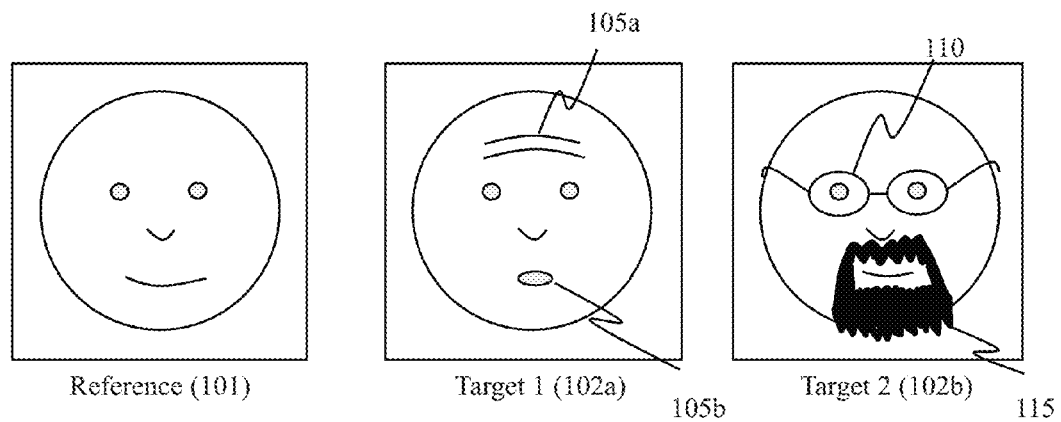
FIG. 1 illustrates possible facial images.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Throughout the specification, reference may be made to a "device" or one or more "devices." As used herein, "device" may refer to any apparatus, machine, or article capable of supporting and/or facilitating facial recognition functionality discussed herein. Further, even though a particular description may refer to a "device," it is to be understood that the functionality may be performed on a plurality of devices without deviating from the scope of the disclosure. The description may also include discussion of one or more "computing devices." As used herein, a "computing device" refers to any one or more devices capable of enabling the facial recognition functionality discussed hereinafter. A computing device may comprise a non-transitory computer readable medium having instructions thereon. The computing device may be capable of executing the instructions of the non-transitory computer readable medium in order to enable the facial recognition functionality discussed herein. By way of non-limiting examples of computing devices, a computing device may comprise one or more client computers, one or more servers, a laptop or desktop computer, a tablet computer, a smartphone, and/or any combination thereof communicably networked (e.g., a computing system). Indeed, consistent with the foregoing description, a computing device may comprise any device capable of performing or participating in the performance of facial recognition. Computing devices will be discussed in more detailed in relation to FIG. 8.

The description of the present disclosure may include the description of processes and/or methods. These descriptions may go to the storage, transmission, and/or processing of signals and/or states. The process of facial recognition goes to the transformation of these signals and/or states such that it has a different function and/or is suitable for a different use. By way of example, signals and/or states may be received corresponding to a target image for facial recognition, and the received signals and/or states may be transformed to have a different function and/or be suitable for a different use (e.g., facial recognition).

The specification uses terms such as "recognize," "recognition," "facial recognition," "facial recognition match," and/or "match," in reference to methods and/or processes of performing facial recognition. In particular implementations, facial recognition may refer to computer-implemented processes of identifying the presence of faces, comparing faces with facial records, and/or arriving at a match between an identified face and a face from facial records. Therefore, "recognize," "recognition," "facial recognition match," and/or "match" may refer to methods and/or processes for arriving at a match between an identified face and a face from facial records. It is to be understood that in at least some cases the identified face may be identified from an image, which may be represented by a combination of signals and/or states. By way of example, a computing system capable of performing facial recognition may receive an image comprising one or more faces. The image may be analyzed and the faces recognized. The computing system may use one or more detection frames in the process of facial recognition. As used herein, a detection frame refers to a subpart or portion of an image that may be used to perform facial recognition functionality. By way of example, an image may include a plurality of faces, and a portion of the image may be extracted and/or focused on by way of a detection frame.

In a particular implementation, facial recognition may refer to a process by which a face is recognized by one or more computing devices. In some cases, facial recognition may use a reference image 101 of a given user to determine whether a target image 102a or 102b also corresponds to the given user. For example, one or more computing devices may have access to one or more images associated with a User A corresponding to a person. For instance, there may be one or more databases comprising images corresponding to users that may be used as reference images. Any of the one or more images associated with User A (or any combination of images) may comprise a reference image to be used for facial recognition. For instance, referring to FIG. 1, reference image 101 may correspond to the one or more images associated with a User A.

In one case, the one or more computing devices may attempt to recognize a person in a target image by referring to reference image 101. For instance, the one or more computing devices may refer to a target image 102a and may determine whether the face in target image 102a is the face of User A by comparing target image 102a with reference image 101. In one case, the face in target image 102a may exhibit facial expressions not reflected in reference image 101. For instance, the mouth region in target image 102a may show an expression 105b that may not match the expression in reference image 101. In some cases, when expression in the reference image do not match expressions in the target image, the one or more computing devices may be unable to recognize the face, even if both the target and reference images are of the same person. Said otherwise, even if the target and reference images are of the same person, the one or more computing devices may not be able to match, or recognize, the person in the target image if the expression in the target and reference images is different. It follows, therefore, that any number of possible facial expressions and/or distortions of the face may render recognizing a face more challenging for a computing system. For instance, wrinkles of the skin surface as illustrated by expression 105a may present challenges in the process of recognizing the face in the target image 102a. Of course, these are but a few of the numerous examples and ways in which facial expressions may influence the facial recognition process, and the present disclosure is not to be taken to be limiting in that sense.

It follows then that in addition to facial expressions affecting the facial recognition process, accessories and/or changes may render facial recognition more challenging for a facial recognition system. Referring, for example, to target image 2 in FIG. 1, the person in the target image may be wearing some sort of accessory, such as glasses 110, which may obscure or otherwise render achieving a facial recognition match challenging. Any number of accessories including, but not limited to, prescription glasses, sun glasses, hats, visors, headbands, earrings, piercings, contact lenses, scarfs, etc. may affect the facial recognition process. Similar to the preceding example related to facial expressions, the presence of one or more accessories in the target or reference image may influence the ability of the one or more computing device to make a facial recognition match.

Furthermore, changes to the physical appearance may also influence the ability of the one or more computing device of making a facial recognition match. By way of example, the growth (or loss) of facial hair, as illustrated by beard 115 in FIG. 1, may present challenges during the facial recognition process. The present disclosure contemplates any kind of change in the physical appearance including, but not limited to, skin blemishes, moles, birth marks, burns, scars, and cuts, among other things.

In one embodiment, facial recognition comprises the process of matching "features" of a target image to features of a reference image. As used herein, a feature may refer to an identifying characteristic or "landmarks" of a face in an image. For example, features may refer to the size, position, and/or shape of eyes, nose, cheekbones, jaw, mouth, etc. In one embodiment, the features of a face in an image may refer to details of the skin such as, for example, wrinkles, scars, moles, dimples, freckles, birthmarks, etc. Additionally, a feature may comprise and/or refer to a "local feature." Local features refer to local facial image patches that may comprise unique texture and/or structure. For example, an area in the corner of an eye may be a local feature and may be contrasted with landmarks such as one or more eyes or a nose. It is noted that a landmark, such as an eye, may comprise a plurality of local features. In one embodiment, local features can be detected using specific processes and/or algorithms such as, by way of non-limiting example: Harris, Hessian, Harris-Laplace, Hessian-Laplace, scale-invariant feature transform (SIFT), difference of Gaussians (DoG), Speeded Up Robust Features (SURF), or maximally stable extremal regions (MSER), among other processes.

Figure 2:
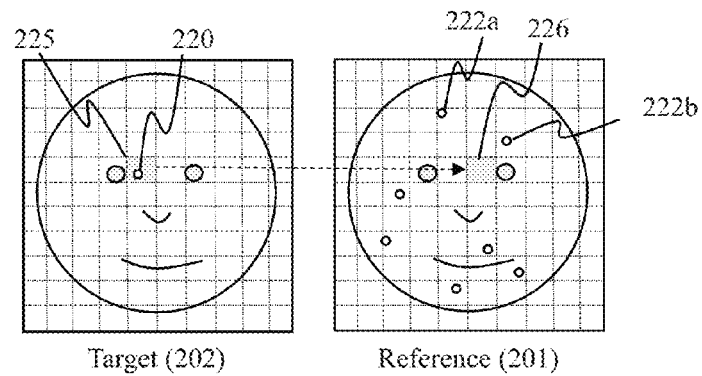
FIG. 2 illustrates one method of performing feature matching.

By way of example, FIG. 2 illustrates a target image 202 and a reference image 201. A process or method may be performed relative to target image 202 and reference image 201 to enable facial recognition of a face in target image 202. In one embodiment, this process may be performed in real-time. This process may comprise the use of features and the matching thereof. For example, one or more features may be identified in the target and reference images 202 and 201. In one embodiment, the identified features may be compared to determine whether there are any matching features. For example, a feature 220 of target image 202 may be compared relative to features reference image 201 (e.g., features 222a and 222b).

In one embodiment, the process of performing facial recognition may comprise dividing the target and reference images 202 and 201 into regions. For instance, the faces in the target and reference images may be scaled and/or centered to allow the division of relatively equal regions of the face. In one embodiment, one or more faces in an image may be centered within a detection frame to facilitate facial recognition. As illustrated in FIG. 2, a feature identified in target image 202 may be identified, and the corresponding region 225 of target image 202 may be compared with a respective region or regions of the reference image 201 (e.g., region 226). In one embodiment, the respective regions of one or more identified features of the reference image 201 may also be compared with corresponding regions of the target image. Thus, for example, the regions corresponding to local features 222a and 222b of the reference image may be compared with counterpart regions in the target image.

Based on the comparison of features and regions of the target and reference images, a determination may be made as to whether there is a facial recognition match. For instance, if it is determined that the target and reference images have insufficient features in common, then it may be determined that there is no facial recognition match. In contrast, if the number or distribution of matched features meets or exceeds a certain threshold, it may be determined that there is a facial recognition match between the target and reference images.

In one embodiment consistent with the present disclosure, rather than dividing a target and reference image into fixed regions, an adaptive search window may be used. For instance, an adaptive search window may refer to a region of a target or reference image of an adaptable size, form, and/or position. In one embodiment, the adaptive search window may be capable of being centered on a given feature in a target or reference image, and the adaptive search window may be compared with a counterpart adaptive search window in the other image. In one embodiment, a feature to be matched may be used as the center of the adaptive search window.

Figure 3:
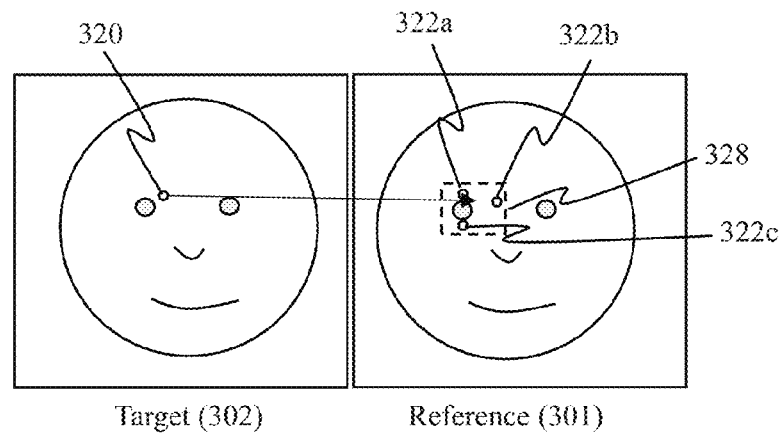
FIG. 3 illustrates a method of feature matching according to one embodiment.

Turning to FIG. 3, a target image 302 and a reference image 301 are shown. A feature 320 in target image 302 is identified and an adaptive search window 328 is used in reference image 301 to facilitate matching feature 320 to a feature in reference image 301. The size, form, and/or shape of adaptive search window 328 may be determined by any number of factors including, but not limited to, the size of the feature-in-question, the number of possible matching features in reference image 301, the number or distribution of features in the region of feature 320, and/or the size of the image or detection frame. For instance, in one embodiment, adaptive search window 328 may be selected such that features 322a, 322b, and 322c fall within the adaptive search window. Furthermore, in one embodiment, adaptive search window 328 may be centered on a given feature.

In one embodiment, a target image may be received for facial recognition. A detection frame may be used to facilitate the facial recognition process. A plurality of features may be detected in the detection frame of the target image. Based at least in part on the detected features, one or more reference images may be selected from a database. In one example, a first feature from the target image may be extracted and compared with features in one of the one or more reference images using an adaptive search window. It may be determined that based at least in part on the adaptive search window, the first feature has a match in the one of the one or more reference images. A second feature from the target image may then be extracted and compared with features in the one of the one or more reference images using another adaptive search window. And it may be determined that based at least in part on the adaptive search window, the second feature has a match in the one of the one or more reference images. The remaining features may also be compared using one or more adaptive search windows to determining whether they have a match in the one of the one or more reference images. This process is generally illustrated in FIG. 4 and discussed in the following paragraphs.

Figure 4:
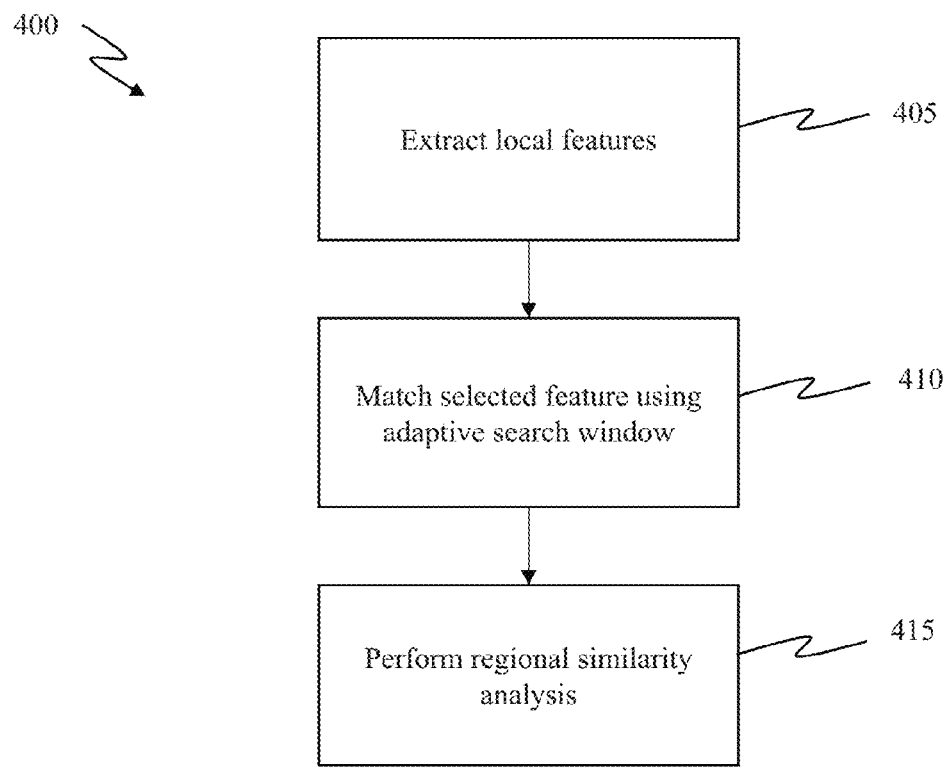
FIG. 4 illustrates a method of facial recognition according to another embodiment.

FIG. 4 illustrates a method 400 of determining a facial recognition match between a reference image and a target image. At a first block 405, features are extracted from the target and reference image. In some cases, features in the reference image may already be identified. At a second block 410, the extracted features may be matched using an adaptive search window, as discussed previously. Next, at a block 415, regional similarity distribution analysis (RSDA) may be performed on the matched features. RSDA may refer to a process by which matched features may be weighted to arrive at a confidence value of a facial recognition match. For instance, if a large number of matched features do not meet certain conditions, it may be determined that the facial recognition match may not be made with a high amount of confidence. Said otherwise, if it is determined that for any number of possible factors, matched features do not meet certain minimum conditions, then the weight of the contribution of those matched features to the overall facial detection process may be reduced. For instance, the aggregate weight or contribution of matched features may yield a confidence value that may roughly correspond to a statistical confidence in an overall facial recognition match. Similarly, if it is determined that matched features do meet certain minimum conditions, then the weight of those matched features may be increased, leading to a heightened confidence value.

Figure 5:
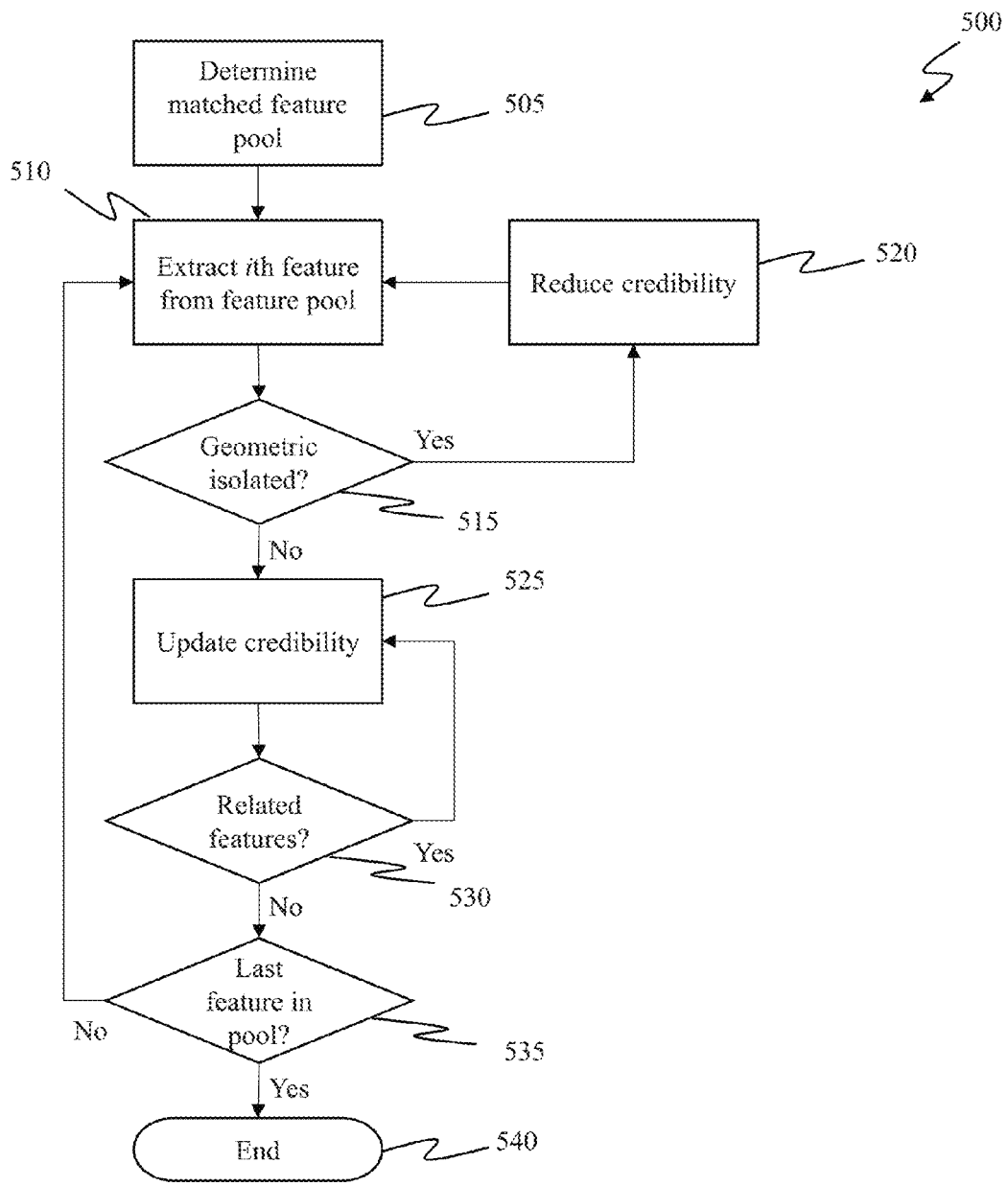
FIG. 5 illustrates a method of facial recognition according to one embodiment.

FIG. 5 illustrates a process 500 of facial recognition matching according to one embodiment of the disclosure. It is noted that process 500 will be explained in relation to the preceding and subsequent FIGS. In one embodiment, the process 500 commences at block 505 with a comparison of one or more target images and one or more reference images in order to determine a pool of matched features. The determination of matched features was discussed above in relation to FIGS. 1-4. In one example, as matched features are determined, they may be included in a matched feature pool. In one case, an adaptive search window, such as adaptive search window 328 illustrated in FIG. 3, may be used in order to arrive at a pool of matched features. By way of further example, FIG. 6(a) illustrates a sample image illustrating a collection of matched features illustrated by the circles and stars on the face (e.g., 650a, 650b, 651a, 651b, and 651c). It is noted that features 650a and 650b are denoted with stars to facilitate the discussion of the process 500, but that the features represented with stars are not inherently different from the other features represented by circles. In one example, the matched features illustrated in FIG. 6(a) may be determined based at least in part on one or more adaptive search windows, such as, for example, adaptive search window 628.

At a block 510, a feature is extracted from the matched feature pool. In FIG. 5 this is illustrated as the ith feature, and will increase (e.g., 1+1, 1+2, . . . , 1+n) with each subsequent loop through process 500. So, for instance, in one embodiment, matched feature 650a may be extracted for analysis. In this embodiment, matched feature 650a may be passed on for further processing and/or analysis. At block 515, a determination may be made as to whether the feature is geometrically isolated. Geometric isolation of features may refer to whether there are other matched features around the extracted feature, such as, for example, within an adaptive search window. Thus, in one embodiment matched feature 650a may be extracted and a determination made as to whether feature 650a is geometrically isolated. Thus, in one embodiment, and as shown in FIG. 6(a), there are other matched features (features 651a and 651b) near feature 650a. In this case, feature 650a may be determined to not be geometrically isolated. As such, at block 515 process 500 may continue on to block 525 and the update credibility block. In one case, updating credibility at block 525 comprises providing a higher weighting for a matched feature. However, in the example of matched feature 650b, at the geometric isolation determination block 515, it may be determined that feature 650b is geometrically isolated, such as is illustrated in FIGS. 6(a) and 6(c), and process 500 may thereafter continue to block 520. In one case, reducing credibility at block 520 comprises providing a lower or negative weighting contribution for the matched feature.

At block 525 a credibility of the facial recognition match may be updated. The credibility of a facial recognition match may refer to the reliability of a potential facial recognition match. The present disclosure discloses a process whereby each matched feature may be compared and assigned a credibility or weighting contribution. The process may then use the aggregate of weighting contributions or weights of all of the matched features to arrive at an overall credibility for a facial recognition match. In one embodiment, the credibility of a facial recognition match may be modeled by:

$$f_i = \begin{cases} +r/(d_i + r) & \text{if } d_i < r \\ -r/(r+r) & \text{else} \end{cases} \rightarrow f_s = 1 + \sum_{i=1}^{N} f_i$$

Where r refers to a radius of an analyzed region (e.g., adaptive search window), $d_i$ refers to a distance between the center of the analyzed region and a given related feature, $f_i$ refers to a weighting or credibility contribution of an ith feature relative to a central extracted feature, and $f_s$ refers to a similarity factor, which may be considered a weighting or credibility of an extracted feature match and/or a facial recognition match. Furthermore, r is approximately within:

$$\left[ \frac{\sqrt[2]{a \times b}}{20} \sim \frac{\sqrt[2]{a \times b}}{5} \right],$$

where a refers to a detection frame height, and b refers to a detection frame width.

Figure 6:
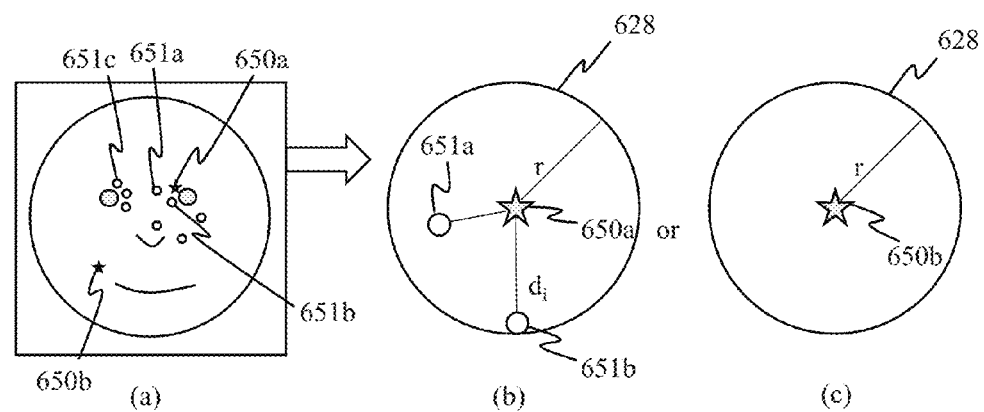
FIG. 6 illustrates exemplary facial recognition functionality according to one embodiment.

Using the features illustrated in FIG. 6(*a*), it is possible to illustrate one possible implementation of the foregoing process. For instance, in one embodiment it may be possible to calculate a credibility of or a weight for a matched feature, such as matched feature 650*a*. In this example, matched features are extracted surrounding matched feature 650*a* in order to determine the credibility of matched feature 650*a* as shown by block 510 of FIG. 5. For instance, as illustrated by FIG. 6(*b*), an adaptive search window 628 may be defined with a radius r and may be centered on matched feature 650*a*. And consistent with the above, r may be selected such that a ratio between r and the detection frame is constant and between $$\left[ \frac{\sqrt[2]{a \times b}}{20} \sim \frac{\sqrt[2]{a \times b}}{5} \right].$$

In one embodiment, the selection of a size of an adaptive search window may be related to, for instance, processing limits, speed of the facial recognition process, and error thresholds (e.g., false positive and negative thresholds), among other things.

Returning to FIG. 6(*a*), a credibility value for matched feature 650*a* may be determined by calculating a contribution by feature 651*b*. This contribution may be determined based on $f_i=+r/(d_i+r)$. This contribution may be added to the contribution of any other features within the adaptive search window. In one case, adding this contribution may comprise providing a higher weighting for the matched feature. Next, a credibility contribution for matched feature 650*a* may be determined by calculation a contribution by feature 651*a*. Similarly, the contribution by feature 651*a* may be determined based on $f_i=+r/(d_i+r)$. At block 530, a determination may be made as to whether any related features should contribute to the credibility of a matched feature. This determination may be based at least in part on r, such that if r is larger, more matched features may be considered relevant. Thus, by way of example, process may step through matched features 651*a* and 651*b* and then determine that there are no further related features.

At block 535, a determination may be made as to whether there are additional features in the matched feature pool for which to calculate a credibility value. By way of example, in one embodiment, a credibility value may be calculated for matched feature 650*b*. In this case, it may be determined that feature 650*b* is geometrically isolated, such as is shown in FIGS. 6(*a*) and 6(*c*). Therefore, in one example, a credibility for feature 650*b* may be calculated consistent with $f_i=-r/(r+r)$, where r may be determined consistent with the foregoing discussion using the example of feature 650*a*. In one case, adding the credibility for feature 650*b* to the credibility of a facial recognition match comprises providing a lower or negative weighting for feature 650*b*. The credibility for all of the matched features may be aggregated to arrive at a total credibility for a facial recognition match. For instance, the credibility value for features 650*a*, 650*b*, 651*a*, 651*b*, and 651*c* may be added to that of any other features to arrive at a total credibility for a facial recognition match.

Based on the foregoing description, those of ordinary skill in the art should understand that the greater the number or distribution of matched features in proximity to each other, the greater the credibility of the facial recognition match. Said otherwise, if a given target image has an equal number of matched features with each of a first and a second reference image, the credibility of the match with each of the first and second reference images, respectively, may be based at least in part on the number of the matched features that are in proximity to each other. In one example, if 50% or more of the matched features in the first reference image are in proximity, while less than 50% of the matched features in the second reference are in proximity, the facial recognition match with the first reference image may have a higher credibility value. Similarly, it should also be understood that the closer the matched features, or the smaller the distance between matched features, the higher the credibility of the match.

Figure 7:
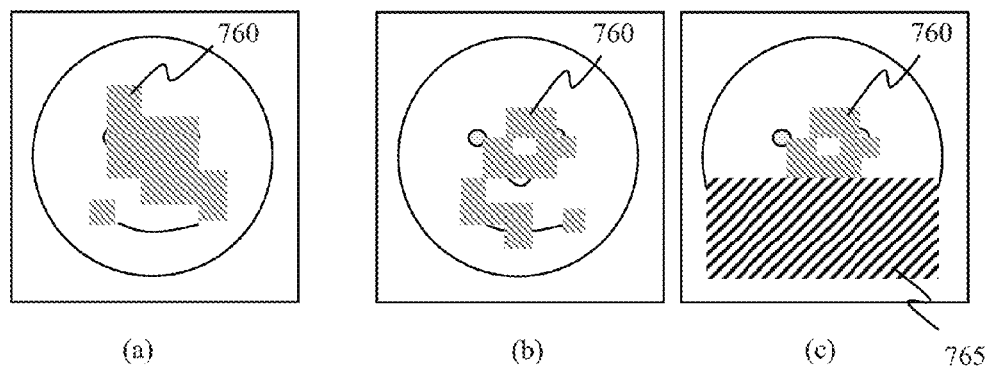
FIG. 7 illustrates further exemplary facial recognition functionality according to one embodiment.

In addition to determining a credibility of each matched feature, another aspect of RSDA may comprise the determination of a facial information utilization ratio. A facial information utilization ratio may refer to the amount of facial information used in making a facial recognition match. In particular implementations, a utilization ratio may refer to a percentage of the surface area of an image or detection frame that is matched. Said otherwise, a utilization ratio may refer to a ratio between a matching area on the one hand, and a surface area of a detection frame or image. In one embodiment, the utilization ratio may be determined by segmenting the detection frame, and calculating a detection area corresponding to segments with matched features arranged therein. Turning for instance to FIG. 7, in FIG. 7(*a*), an image or detection frame is illustrated comprising a face with a detection area 760 representing an area of the face that has been matched pursuant to a facial detection process. It appears that detection area 760 may comprise less than a quarter of the total surface area of the image or detection frame in FIG. 7(a). As such, the utilization ratio in FIG. 7(a) may be considered less than approximately ¼.

In one example, a utilization ratio UR may be determined by UR=$S_{max}$/I, where $S_{max}$ refers to the biggest area that the matching pairs of images (or detection frames) covers among all classes (e.g., people) in a database, and I refers to the image or detection frame total surface area. In one case, the utilization ratio may be used in order to calculate a final similarity factor $F_s$ of a facial recognition match: $F_S$=$f_S$/UR. Further, in one embodiment, if $S_{max}$ is determined to be below a certain threshold, then the utilization ratio may be intentionally omitted because, for instance, it may be determined likely that the face in the target image is not in the relevant image database.

Looking, for instance, at FIGS. 7(b) and (c), both illustrate an image with a detection area 760. In FIG. 7(c), a portion of the face is obscured by an obstruction 765. In one embodiment, this may be an accessory such as a scarf. It should be understood, however, that obstruction 765 may represent any obstruction that may hide a portion of a face of a target image. Notably however, according to the present disclosure, even if a portion of a face is obscured, for instance, a computing device may be capable of arriving at a facial recognition match. For instance, if it is assumed that the facial recognition match in FIG. 7(c) has a similarity factor of $f_s'$ while the facial recognition match in FIG. 7(b) has a similarity factor of $f_s$, taking into account obstruction 765, we can relate the similarity factors by the following equality:

$$f_s' = \frac{1}{2}f_s.$$

Furthermore, obstruction 765 is also such that the surface area of the respective figures can be related based on the following equality:

$$S_{max}' = \frac{1}{2}S_{max},$$

where, consistent with the preceding equality, $S_{max}'$ refers to the matching area illustrated in FIG. 7(c), while $S_{max}$ refers to the matching area illustrated in FIG. 7(b). Using this information to calculate a final similarity factor for the example in FIG. 7(c), we arrive at:

$$F_s' = \left(\frac{1}{2}f_s\right) / \left(\frac{\frac{1}{2}S_{max}}{I}\right),$$

which reduces to:

$$F_s' = (f_s) / \left(\frac{S_{max}}{I}\right),$$

which is, of course, $F_s$. Said otherwise, $F_S'$=$F_S$. Therefore, in at least one embodiment, the present application proposes a process that facilitates the use of a utilization ratio in order to achieve a final similarity factor in an obscured facial recognition case equal to that of an unobscured facial recognition case. Of course, the foregoing is merely provided to illustrate the functionality and operational concepts and principles and is not to be taken in a limiting sense. As would be readily appreciated by those of ordinary skill in the art, the full scope of the present subject matter is not limited by the preceding discussion and examples.

Indeed, one skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

Figure 8:
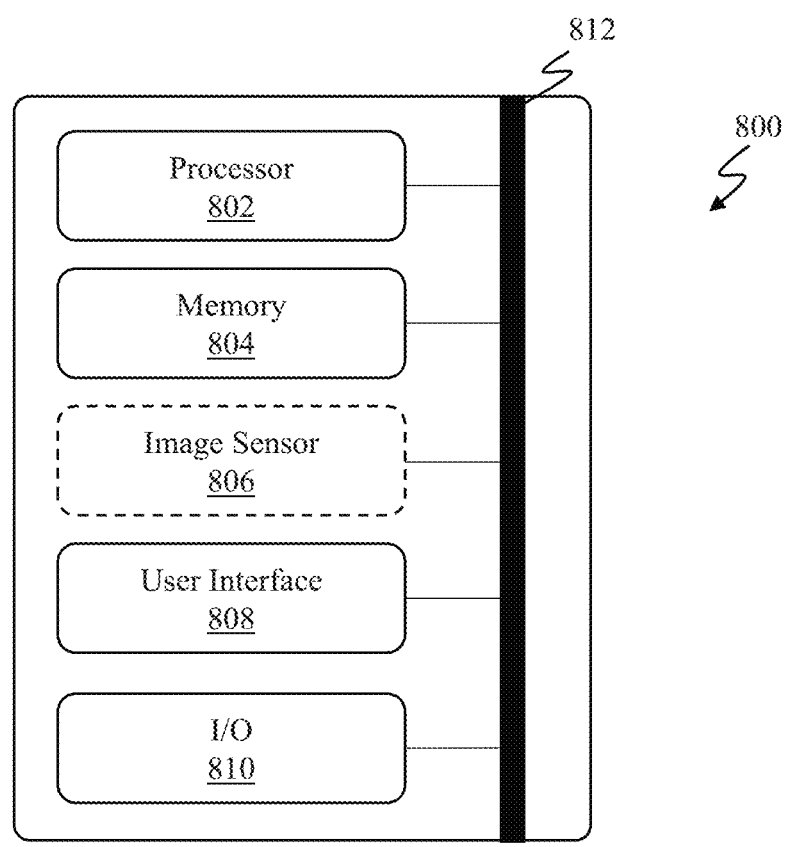
FIG. 8 is a block diagram illustrating a computing device according to one embodiment.

The present disclosure refers to, among other things, computing devices for the implementation of methods and functionalities discussed herein. FIG. 8 is a block diagram illustrating a computing device 800 according to one embodiment. As illustrated, and consistent with the foregoing, a computing device 800 may comprise a bus capable of facilitating the transmission and reception of signals and/or states between different portions of computing device 800. For example, bus 812 may be connected to a processor 802, a memory 804, an image sensor 806, a user interface 808, and/or an I/O 810, among other things. Processor 802 may comprise any suitable combination of hardware, software, and/or firmware capable of providing processing and/or execution of instructions. Memory 804 may comprise one or more memory units and may comprise any suitable memory including, but not limited to, volatile and non-volatile memory. For example, memory 804 may comprise RAM, flash memory, magnetic memory, and phase change memory, among other things. In one embodiment, memory 804 may have instructions stored thereon for execution by processor 802. In another embodiment, memory 804 may store signals and/or states related to images and/or facial recognition functionality.

Image sensor 806 may comprise any suitable combination of hardware, software, and/or firmware to facilitate the capture and storage of images. For instance, in one embodiment, image sensor 806 may comprise a charge-coupled device (CCD) capable of capturing light and converting the incoming light photons to electric charges. The electric charges may be manipulated or processed by image sensor 806, or they may be transmitted via bus 812 to processor and/or to memory 804 for storage. In another embodiment, image sensor 806 may comprise a CMOS-based image sensor. Of course, any other suitable form of sensor is contemplated by the present disclosure. It is noted that in some embodiments, computing device 800 may not comprise image sensor 806, but may receive signals and/or states related to images from an external source.

User interface 808 may comprise any suitable module relating to an interface with users, devices, and/or other modules of computing device 800. For instance, interface 808 may comprise a combination of hardware, software, and/or firmware capable of facilitating an interface to allow interaction with a user. In one embodiment, interface 808 may transmit and receive data related to a graphical user interface with which a user may interact. In another embodiment, interface 808 may facilitate communication with a device external to computing device 800. For instance, interface 808 may transmit and/or receive communications related to a device external to computing device 800 related to, among other things, facial recognition.

I/O 810 may comprise any module relating to the input/output of a device. For instance, I/O 810 may comprise a combination of hardware, software, and/or firmware and facilitate functionality relating to input and output functionality of computing device 800.

In one embodiment, signals and/or states related to facial recognition may be transmitted and/or received from user interface 808 and I/O 810.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method of facial recognition by a computing device, the method comprising:
    identifying, via a processor of the computing device, one or more features of a target image;
    matching, via the processor, at least one of the one or more features of the target image with one or more features of a reference image;
    determining, via the processor, a weighting contribution for the at least one matched feature;
    determining, via the processor, a credibility of a facial recognition match based at least in part on the weighting contribution of the at least one matched feature, wherein the determining a weighting contribution comprises providing a higher weighting for the at least one matched feature based at least in part on a number of other matched features relative to the at least one matched feature; and
    determining a utilization ratio based at least in part on a ratio of a matching area to a surface area of a detection frame.

2. The method of claim 1, wherein the determining a weighting contribution comprises providing a higher weighting for the at least one matched feature based at least in part on a distance to one or more other matched features.

3. The method of claim 1, wherein the matching the at least one of the one or more features comprises using an adaptive window.

4. The method of claim 1, wherein the determining a weighting contribution comprises providing a lower weighting for the at least one matched feature based at least in part on a determination of geometric isolation.

5. The method of claim 3, further comprising centering the adaptive window on the at least one matched feature.

6. The method of claim 1 further comprising determining a final similarity factor of the facial recognition match based at least in part on the utilization ratio.

7. The method of claim 3, wherein the adaptive window is a circle with a radius between $$\left[ \frac{\sqrt[2]{a \times b}}{20} \sim \frac{\sqrt[2]{a \times b}}{5} \right],$$

where a refers to a detection frame height, and b refers to a detection frame width.

8. The method of claim 1, wherein the at least one matched feature is included in a matched feature pool.

9. An article including a non-transitory computer readable medium having instructions thereon, the instructions executable to:
    identify one or more features of a target image;
    match, using an adaptive window, at least one of the one or more features of the target image with one or more features of a reference image;
    determine a weighting contribution for the at least one matched feature;
    determine a credibility of a facial recognition match based at least in part on the weighting contribution of the at least one matched feature; and
    determine a utilization ratio based at least in part on a ratio of a matching area to a surface area of a detection frame.

10. The article of claim 9, wherein the instructions executable to determine a weighting contribution are further to provide a higher weighting for the at least one matched feature based at least in part on a distance to one or more other matched features.

11. The article of claim 9, wherein the instructions executable to determine a weighting contribution are further to provide a higher weighting for the at least one matched feature based at least in part on a number of other matched features also within the adaptive window.

12. The article of claim 9 wherein the instructions executable to determine a weighting contribution are further to provide a lower weighting for the at least one matched feature based at least in part on a determination of geometric isolation.

13. The article of claim 9, wherein the instructions executable to match the at least one of the one or more local features using an adaptive window are further to center the adaptive window on the at least one matched feature.

14. The article of claim 9, wherein the instructions are further to: determine a final similarity factor of the facial recognition match based at least in part on the utilization ratio.

15. A method comprising:
    matching, via a processor of a computing device, at least one feature of a target image with at least one feature of a reference image using an adaptive window;
    determining, via the processor, a weighting contribution for the matched at least one feature;
    determining, via the processor, a credibility of a facial recognition match based at least in part on the weighting contribution of the at least one matched feature; and
    determining a utilization ratio based at least in part on a ratio of a matching area to a surface area of a detection frame.

16. The method of claim 15, wherein the determining a weighting contribution comprises providing a higher weighting for the matched at least one feature based at least in part on a distance to one or more other matched features.

17. The method of claim 15, wherein the determining a weighting contribution comprises providing a higher weighting for the matched at least one feature based at least in part on a number of other matched features within the adaptive window.

18. The method of claim 15, wherein the determining a weighting contribution comprises providing a lower weighting for the matched at least one feature based at least in part on a geometric isolation determination.

19. The method of claim 15, wherein the adaptive window is a circle with a radius between $$\left[ \frac{\sqrt[2]{a \times b}}{20} \sim \frac{\sqrt[2]{a \times b}}{5} \right],$$

where a refers to a detection frame height, and b refers to a detection frame width.

20. The method of claim 15 further comprising determining a final similarity factor of the facial recognition match based at least in part on the utilization ratio.

\* \* \* \* \*